United States Patent
Choi et al.

(10) Patent No.: US 8,039,520 B2
(45) Date of Patent: Oct. 18, 2011

(54) ELECTROLYTE MEMBRANE COMPRISING NANOCOMPOSITE ION COMPLEX, MANUFACTURING METHOD THEREOF, AND FUEL CELL INCLUDING THE SAME

(75) Inventors: Yeong Suk Choi, Yongin-si (KR); Ji Rae Kim, Yongin-si (KR); Tae Kyoung Kim, Uiwang-si (KR); Yoon Hoi Lee, Yongin-si (KR); Eun-ah Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 919 days.

(21) Appl. No.: 11/839,200

(22) Filed: Aug. 15, 2007

(65) Prior Publication Data
US 2008/0176126 A1 Jul. 24, 2008

(30) Foreign Application Priority Data
Sep. 18, 2006 (KR) .................. 10-2006-0090278

(51) Int. Cl.
*C08J 5/20* (2006.01)
*H01M 8/10* (2006.01)
*C08F 283/00* (2006.01)
*C08G 75/23* (2006.01)
*C08G 75/24* (2006.01)
*C08L 81/00* (2006.01)

(52) U.S. Cl. ............. 521/27; 521/25; 528/373; 528/391; 528/503; 524/167; 428/370; 427/115; 525/535; 525/537

(58) Field of Classification Search .................... 521/27, 521/25; 528/503, 391, 373; 524/167; 428/370; 429/33; 427/115; 525/535, 537
See application file for complete search history.

(56) References Cited

U.S. PATENT DOCUMENTS
7,674,505 B2 3/2010 Kerres et al.

FOREIGN PATENT DOCUMENTS
| CN | 1358212 | 7/2002 |
| JP | 2000-290505 | 10/2000 |
| JP | 2003-277610 | 10/2003 |

OTHER PUBLICATIONS

Office Action issued by the Patent Office of the People's Republic of China on Feb. 27, 2009.
Chinese Office Action issued Mar. 18, 2010, in corresponding Chinese Patent Application No. 2010031500233620.
Office Action issued by the Japanese Patent Office on Jul. 6, 2010.

*Primary Examiner* — Duc Truong
(74) *Attorney, Agent, or Firm* — Lee & Morse, P.C.

(57) ABSTRACT

An electrolyte membrane includes a nanocomposite ion complex that is a reaction product of a nanocomposite with a basic polymer. The nanocomposite includes a polymer having a sulfonic acid group and an unmodified clay. Either the unmodified clay has a layered structure and is dispersed in the polymer having the sulfonic acid group, and the polymer is intercalated between layers of the clay or the unmodified clay has an exfoliated structure and the exfoliated layers of the unmodified clay are dispersed in the polymer. The electrolyte membrane shows high mechanical strength, high ionic conductivity, and excellent methanol crossover impeding properties even when the degree of sulfonation of the polymer having the sulfonic acid group is high. When a methanol aqueous solution is used as a fuel, the fuel cell including the electrolyte membrane has a low methanol crossover, and thus, has a high operational efficiency and a long lifetime.

12 Claims, 8 Drawing Sheets

ELECTROLYTE MEMBRANE COMPRISING NANOCOMPOSITE ION COMPLEX, MANUFACTURING METHOD THEREOF, AND FUEL CELL INCLUDING THE SAME

CROSS-REFERENCE TO RELATED APPLICATION

This application claims the benefit of Korean Application No. 2006-90278, filed Sep. 18, 2006, in the Korean Intellectual Property Office, the disclosure of which is incorporated herein by reference.

BACKGROUND OF THE INVENTION

1. Field of the Invention

Aspects of the present invention relate to an electrolyte membrane including a nanocomposite ion complex, a manufacturing method thereof, and a fuel cell including the same. More particularly, aspects of the present invention relate to an electrolyte membrane including a nanocomposite ion complex obtained by introducing a basic polymer to a nanocomposite obtained by dispersing clay into sulfonated polysulfone on a nanoscale basis and having excellent hydrogen ion conductivity, low methanol crossover, and excellent mechanical strength.

2. Description of the Related Art

Fuel cells developed until now have been classified into polymer electrolyte membrane (PEM) fuel cells, phosphoric acid fuel cells, molten carbonate electrolyte fuel cells, and solid oxide fuel cells, according to the kind of electrolyte used. Depending on the electrolyte used, fuel cells include different constituting elements, and operate at different operating temperatures.

Clay exhibits exceptional properties, such as dimensional stability, heat resistance, mechanical strength, barrier properties, that cannot be realized in a conventional composite, when clay is dispersed into a polymer on a nanoscale basis. A technique of forming a composite using clay and a polymer is disclosed in Japanese Patent Laid-open Publication Nos. 2000-290505 and 2003-277610.

However, since condensation polymerization requires high monomer purity, monomer reactivity control, moisture removal, and temperature control, when a composite is formed using clay, it is very difficult to obtain a high molecular weight polymer.

SUMMARY OF THE INVENTION

Aspects of the present invention provide an electrolyte membrane having excellent mechanical strength and enhanced ionic conductivity, and a manufacturing method thereof.

Aspects of the present invention also provide a fuel cell including the electrolyte membrane and having high fuel efficiency and high energy density.

According to an aspect of the present invention, there is provided an electrolyte membrane including a nanocomposite ion complex that is a reaction product of a nanocomposite and a basic polymer, wherein the nanocomposite includes a polymer having a sulfonic acid group and a unmodified clay dispersed in the polymer having the sulfonic acid group, wherein either the unmodified clay has a layered structure and the polymer having a sulfonic acid group is intercalated between layers of the clay or the unmodified clay has an exfoliated structure and exfoliated layers of the unmodified clay are dispersed in the polymer having the sulfonic acid group.

According to another aspect of the present invention, there is provided a method of preparing an electrolyte membrane, the method including: performing polymerization by heat treating a mixture of a unmodified clay, a first polymerizable monomer for forming a sulfonated polysulfone, a second polymerizable monomer for forming a sulfonated polysulfone, and a diol compound in a solvent to obtain a nanocomposite dissolved in the solvent; and mixing the nanocomposite dissolved in the solvent with a basic polymer and then coating the resultant mixture onto a support to obtain the electrolyte membrane.

According to another aspect of the present invention, there is provided a method of preparing an electrolyte membrane, the method including: performing condensation polymerization by heat treating a mixture of a first polymerizable monomer for forming a sulfonated polysulfone, a second polymerizable monomer for forming a sulfonated polysulfone, and a diol compound in a solvent; adding a unmodified clay into the resultant product of the condensation polymerization to obtain a nanocomposite dissolved in the solvent; and mixing the nanocomposite dissolved in the solvent with a basic polymer and then coating the resultant mixture onto a support, thereby forming the electrolyte membrane.

According to another aspect of the present invention, there is provided a method of preparing an electrolyte membrane, the method including: dissolving a sulfonated polysulfone in a solvent to prepare a sulfonated polysulfone solution; dispersing clay into a dispersion medium to obtain a clay dispersion solution; mixing the sulfonated polysulfone solution with the clay dispersion solution to obtain a first mixture; and mixing the first mixture with a basic polymer to obtain a resultant mixture and coating the resultant mixture including the basic polymer onto a support, thereby forming an electrolyte membrane.

According to another aspect of the present invention, there is provided a fuel cell including a cathode, an anode, and the electrolyte membrane described above interposed between the cathode and the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7A-7C are transmission electron microscope (TEM) images of an electrolyte membrane prepared according to Example 3;

DETAILED DESCRIPTION OF THE EMBODIMENTS

Figure 1:
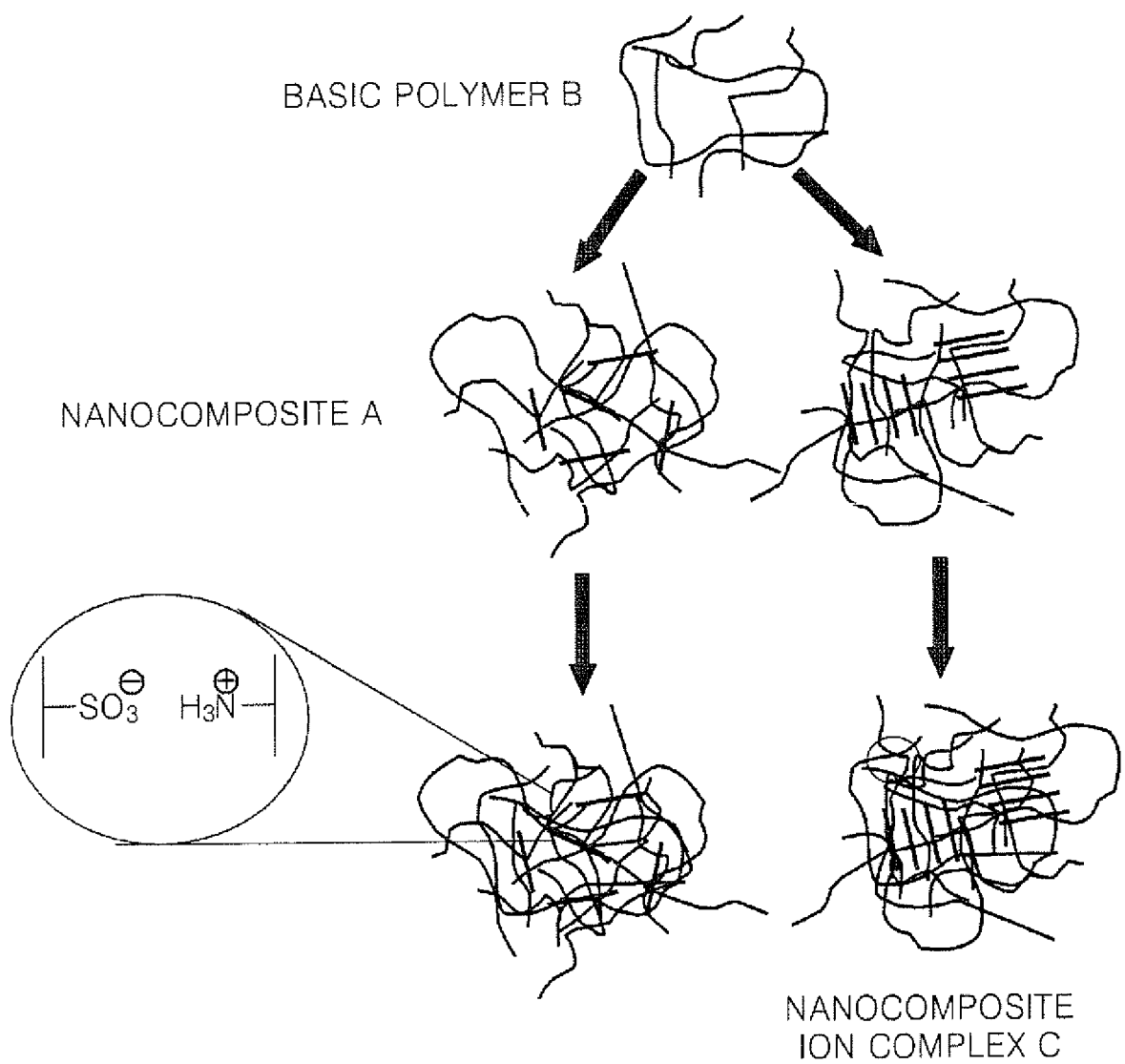
FIG. 1 is a conceptual view illustrating a process of forming a nanocomposite ion complex included in an electrolyte membrane according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings.

An electrolyte membrane according to aspects of the present invention includes a nanocomposite ion complex ("Nanocomposite Ion Complex C" in FIG. 1) that is an acid-base complex obtained by reacting a basic polymer ("Basic Polymer B" in FIG. 1) with a nanocomposition ("Nanocomposite A" in FIG. 1) that is prepared by dispersing clay into a polymer having a sulfonic acid group, such as, for example, a sulfonated polysulfone on a nanoscale basis. That is, according to FIG. 1, an acid group of a sulfonic acid group of the sulfonated polysulfone of Nanocomposite A is reacted with a base group of Basic Polymer B to form Nanocomposite Ion Complex C.

Use of the acid-base complex can prevent a problem from occurring when an electrolyte membrane is formed using a nanocomposite that is prepared by dispersing clay into a polymer having a sulfonic acid group having a high degree of sulfonation. That is, ionic conductivity of an electrolyte membrane formed in this way is high but due to a high swelling degree of the polymer having the sulfonic acid group with respect to water, the polymer gelates during fuel cell operation in the presence of water, so that the electrolyte membrane loses its mechanical strength or completely dissolves in water. Thereby the ionic conductivity becomes greatly reduced. In contrast, when an electrolyte membrane is formed using a nanocomposite ion complex as described herein, even when a polymer having a high degree of sulfonation is used to form an electrolyte membrane, a polymer complex electrolyte membrane having high hydrogen ion conductivity, low methanol crossover, and high mechanical strength can be obtained by compensating the mechanical strength of an electrolyte membrane in a humidified environment.

The nanocomposite includes the polymer having a sulfonic acid group and an unmodified clay dispersed in the polymer having a sulfonic acid group. The unmodified clay may have a layered structure, and the polymer may be intercalated between layers of the unmodified clay. Alternatively, the unmodified clay may be exfoliated and nanoscale particles exfoliated from the unmodified clay having the layered structure may be dispersed in the polymer.

The term "unmodified clay" refers to a silicate in which the interlayer distance is increased by water or an intercalant. The unmodified clay can be more easily produced than a modified clay, which is a clay that is modified by an organic phosphonium group or the like, and thus has high production efficiency and is inexpensive. In addition, unmodified clay has a very hydrophilic surface and interacts with water much more strongly than it interacts with methanol. Therefore, when clay is dispersed in an exfoliation form or an intercalation form in the polymer on a nanoscale basis, even a small amount of clay is sufficient to impede methanol crossover. Due to the clay's absorbing properties, a decrease in conductivity of an electrolyte membrane, such as typically occurs when an inorganic material is added, can be minimized.

The unmodified clay used in the present embodiment may be smectite clays, such as montmorillonite, bentonite, saponite, beidellite, nontronite, hectorite, stevensite, laponite, or the like.

In the nanocomposite ion complex according to an embodiment of the present invention, the clay has a layered structure and is uniformly dispersed in the sulfonated polysulfone. In particular, the sulfonated polysulfone may be intercalated between layers of the unmodified clay having the layered structure. Alternatively or in addition, the interlayer distance between layers of the unmodified clay may be increased so that the layers can be exfoliated.

The nanocomposite ion complex according to an embodiment of the present invention in which clay having a layered structure is dispersed in an intercalation form or an exfoliation form in the sulfonated polysulfone having high ionic conductivity, and a sulfonic acid group of the sulfonated polysulfone is bonded to a basic group of a basic polymer, has excellent mechanical strength, heat resistance, and ionic conductivity. In addition, when the nanocomposite ion complex is initially humidified with water, a polar organic fuel, such as methanol or ethanol cannot permeate into the nanocomposite ion complex. Since the nanocomposite ion complex can impede the crossover of a polar organic fuel, it is very useful to form a polymer electrolyte of a fuel cell in which a polar organic fuel cell is directly provided to an anode.

The sulfonated polysulfone may be represented by Formula 1:

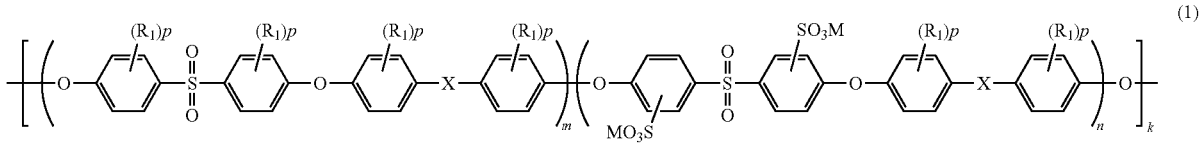

where each $R_1$ is independently selected from the group consisting of a C1-C10 alkyl group, a C2-C10 alkenyl group, a phenyl group, and a nitro group;

p is an integer from 0 to 4;

X is —C(CF$_3$)$_2$—, —C(CH$_3$)$_2$—, or —PY'(=O)— where Y' is H or C$_6$H$_6$;

M is Na, K, or H;

m is a real number from 0.1 to 10;

n is a real number from 0.1 to 10; and k is a real number of 5 to 500.

In Formula 1, the ratio of m to n is a mixture ratio of a sulfonated sulfone repeating unit that does not include a SO$_3$M group to a sulfonated sulfone repeating unit having a SO$_3$M group. Depending on the mixture ratio, the ionic conductivity of the sulfonated polysulfone represented by Formula 1 may vary. In order to obtain excellent ionic conductivity, m may be in the range of 0.1 to 4, and n may be in the range of 0.1 to 4.

In Formula 1, when p=0, (R$_1$)$_0$ represents hydrogen.

The sulfonated polysulfone represented by Formula 1 may have a number average molecular weight of 10,000 to 300,000, a weight average molecular weight of 20,000 to 500,000, and a degree of sulfonation of 40 to 80%.

As a non-limiting example, the compound represented by Formula 1 may be a compound represented by Formula 2:

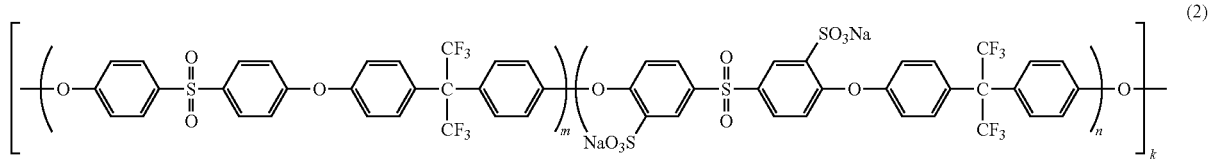

where m is a real number from 0.1 to 4, n is a real number from 0.1 to 4, and k is a real number from 5 to 500.

The compound represented by Formula 2 has S=O and S—O moieties, which are strongly attracted to the clay, so that the clay can be sufficiently interacted with the polymer.

In addition, a functional group at the end of the molecule may be selected to contribute to an increase in the interaction between the polymer and the clay. In particular, both ends of the sulfonated polysulfone represented by Formula 1 may be encapped with a terminal group that acts as a clay modifier so that the sulfonated polysulfone has a strong interaction with the clay. Here, the clay modifier includes at least one group selected from an amino group that is strongly attracted to the clay through an exchange reaction, such as a cation exchange reaction, with a cation, such as Na, K, or Na, included between layers of the clay, and a functional group that can form Van der Waals, polar, or ionic interactions with the surface of the clay, such as benzyl, methyl, sulfate, carbonyl group, or amid group.

As non-limiting examples, the terminal group of the sulfonated polysulfone that acts as a clay modifier can be at least one of 2-acetamidophenol, 3-acetamidophenol, 2,6-di-tert-butyl-4-methylphenol, 3-ethylphenol, 2-amino-4-chlorophenol, 6-amino-2,4-dichloro-3-methylphenol, 4-amino-3-methylphenol, 2-amino-3-nitrophenol, 2-aminophenol, 2-sec-butylphenol, 3-aminophenol, 3-diethylaminophenol, 4,4'-sulfonyldiphenol, 2-methyl-3-nitrophenyl, 3-tert-butylphenol, 2,3-dimethoxyphenol, 4-amino-2,5-dimethylphenol, 2,6-dimethyl-4-nitrophenol, 4-sec-butylphenol, 4-isopropylphenol, 2-amino-4-tert-butylphenol, 2-tertbutyl-4-methylphenol, 4-tert-butyl-2-methylphenol, 4-tert-butylphenol, 2,6-di-tert-butyl-4-methylphenol, 2-amino-5-nitrophenol, 5-isopropyl-3-methylphenol, 4-(methylamino)phenol sulfate, 4-sec-butylphenol, 3-methoxyphenol, 3,5-dimethylthiophenol, 3,5-dimethylphenol, 2-aminophenol, 3-aminophenol, 4-aminophenol, 3-(N,N'-diethylamino)-phenol, 2,6-dimethoxyphenol, 4-acetaminophenol, 2-amino-4-methylphenol, 2,5-dimethylphenol, 2-ethylphenol, 4-ethylphenol, or a mixture or combination thereof.

The basic polymer used in the present embodiment is a polymer having a basic group such as, for example, a group including nitrogen. Non-limiting examples of the basic polymer include polybenzimidazole, poly(4-vinylpyridine), polyethyleneimine, poly(acrylamide-co-diallyldimethylammonium chloride), poly(diallyldimethylammonium chloride), polyacrylamides, such as, for example polyacrylamides disclosed in Brandup J., Polymer Handbook 3$^{rd}$ ed. VI 217, (John Wiley & Sons 1989) (hereafter "Polymer Handbook, 3$^{rd}$ ed."), polyurethanes, such as, for example, polyurethanes disclosed in Polymer Handbook 3$^{rd}$ ed. VI 238, polyamides, such as, for example polyamides disclosed in Polymer Handbook 3$^{rd}$ ed. VI 243, polyimines, such as, for example, polyimines disclosed in Polymer Handbook 3$^{rd}$ ed. VI 248, polyureas, such as, for example, polyureas disclosed in Polymer Handbook 3$^{rd}$ ed. VI 249, polybenzoxazoles, such as, for example, polybenzoxazoles disclosed in Polymer Handbook 3$^{rd}$ ed. VI 250, polybenzimidazoles, such as, for example, polybenzimidazoles disclosed in Polymer Handbook 3$^{rd}$ ed. VI 253, and polypyrrolidones, such as, for example, polypyrrolidones disclosed in Polymer Handbook 3$^{rd}$ ed. VI 257. The basic polymer interacts ionically with the polymer having the sulfonic acid group and undergoes an ion exchange reaction with a cation, such as Na$^+$ or K$^+$, that is present between layers of the clay so that the basic polymer is strongly attracted to the clay. Accordingly, an electrolyte membrane can be formed having excellent mechanical strength and conductivity and low cross-over properties.

The amount of the basic polymer may be in the range of 0.1 to 40 parts by weight, preferably 0.1 to 10 parts by weight, based on 100 parts by weight of the polymer having the sulfonic acid group, that is, the sulfonated polysulfone. When the amount of the basic polymer is less than 0.1 parts by weight, the amount of the generated ion complex is small. On the other hand, when the amount of the basic polymer is more than 40 parts by weight, the conductivity of the electrolyte membrane decreases.

To prepare the nanocomposite ion complex for forming an electrolyte membrane according to an embodiment of the present invention, first, a nanocomposite having excellent mechanical strength and dimensional stability is prepared using clay and a polymer having a sulfonic acid group, and then the nanocomposite is reacted with a basic polymer.

A method of preparing the nanocomposite according to three method embodiments of the present invention will now be described.

In preparing the nanocomposite according to a first method embodiment of the present invention, a moisture-free unmodified clay is mixed with a first polymerizable monomer for forming a sulfonated polysulfone, a second polymerizable monomer for forming a sulfonated polysulfone, and a diol compound (a third monomer), and then, an in-situ polymerization is performed.

In preparing the nanocomposite according to a second method embodiment of the present invention, first, a first polymerizable monomer, a second polymerizable monomer, and a diol compound are mixed and then a polymerization reaction is performed. Then, during the latter part of polymerization, a moisture-free unmodified clay is added to the mixture.

In preparing the nanocomposite according to a third method embodiment of the present invention, a first polymerizable monomer, a second polymerizable monomer, and a diol compound are mixed and then polymerization is performed, thereby obtaining a sulfonated polysulfone. The sulfonated polysulfone is dissolved in a solvent to obtain a sulfonated polysulfone solution. Then, the sulfonated polysulfone solution is mixed with a clay dispersion solution obtained by dispersing clay in a solvent.

These method embodiments, which are for illustrative purposes only and do not limit the present invention, will now be described in detail with respect to FIGS. 2 through 4. In the method embodiments described in FIGS. 2 through 4, the first polymerizable monomer may be a compound represented by Formula 3, the second polymerizable monomer may be a compound represented by Formula 4 and the diol compound (also referred to herein as the "third polymerizable monomer") may be a compound represented by Formula 5:

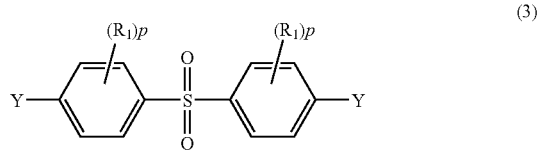

(3)

where $R_1$ and p are the same as described with respect to Formula 1 (that is, each $R_1$ is independently selected from the group consisting of a C1-C10 alkyl group, a C2-C10 alkenyl group, a phenyl group, and a nitro group and p is an integer from 0 to 4); and
Y is Cl, F, Br, or I;

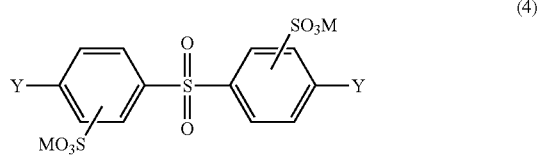

(4)

where M is the same as described in Formula 1 above (that is, M is Na, K, or H); and
Y is Cl, F, Br, or I; and

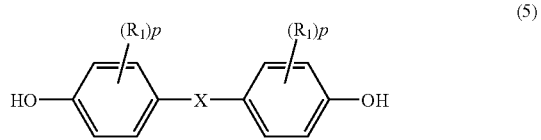

(5)

where $R_1$, X, and p are the same as described in Formula 1 (that is, each $R_1$ is independently selected from the group consisting of a C1-C10 alkyl group, a C2-C10 alkenyl group, a phenyl group, and a nitro group, p is an integer from 0 to 4 and X is —C(CF$_3$)$_2$—, —C(CH$_3$)$_2$—, or —PY'(=O)— where Y' is H or C$_6$H$_6$).

Figure 2:
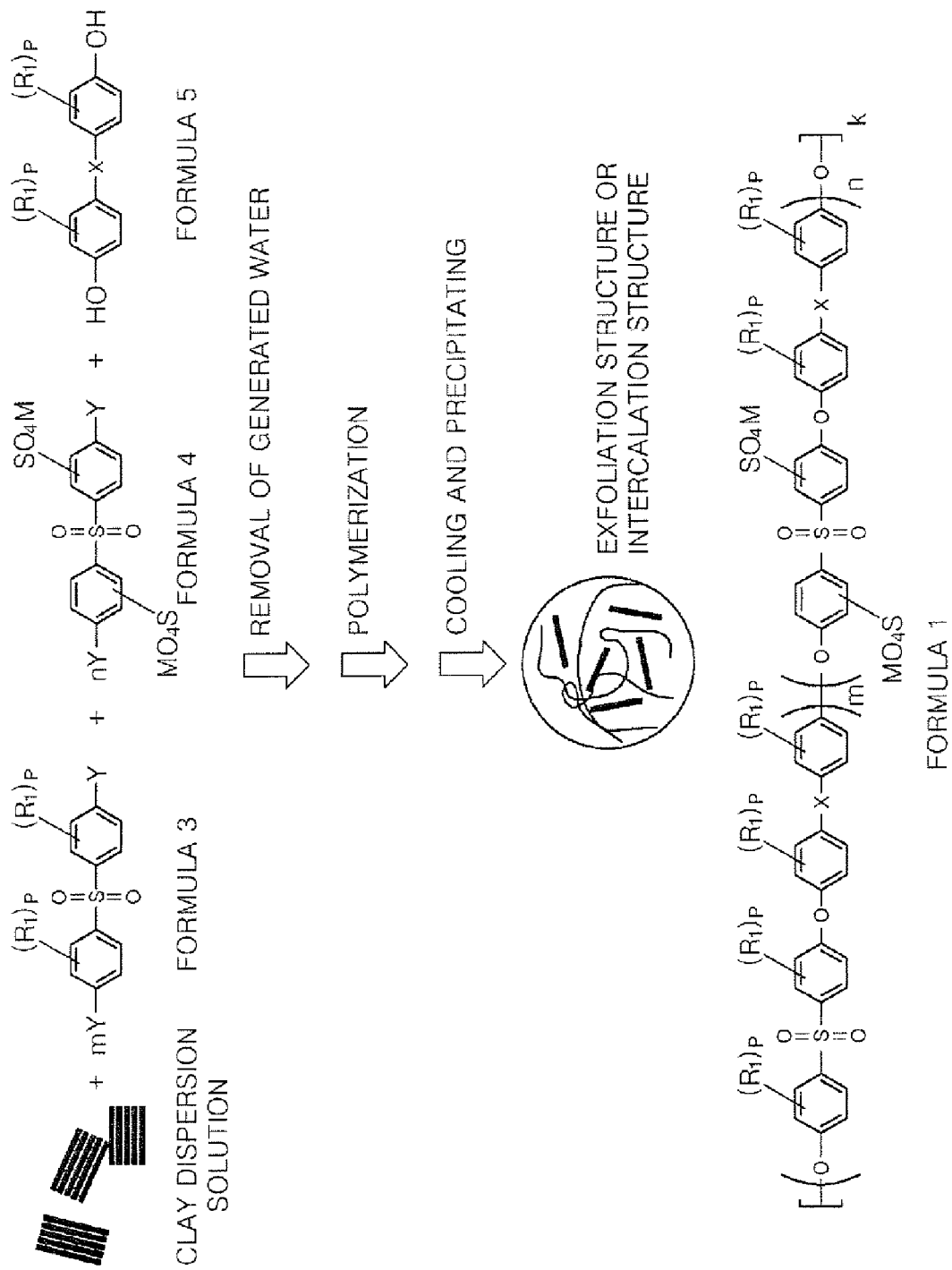
FIGS. 2 through 4 are views illustrating methods of preparing a nanocomposite according to embodiments of the present invention.

The first polymerizable monomer can also be, in addition or as an alternative to the compound represented by Formula 3 illustrated in FIG. 2, 4,4'-difluorobenzophenone, 4,4'-dichlorobenzophenone, m-dichlorobenzene, or m-difluorobenzene.

As non-limiting examples, the first polymerizable monomer can be 4,4' dichlorodiphenyl sulfone (DCDPS), or 4,4'-difluorodiphenyl sulfone. As a non-limiting example, the second polymerizable monomer can be sulfated-4,4' dichlorodiphenyl sulfone (S-DCDPS).

As non-limiting examples, the diol compound can be 4,4'-(hexafluoroisopropylidene)diphenol (HFIPDP), 4,4'-sulfonyldiphenol, 4,4'-isopropylidenediphenol, 4,4'-thiodiphenol, 3,3'-(ethylenedioxy)diphenol, 4,4'-(9-fluorenylidene)diphenol, 4,4'-(1,3-adamantanediyl)diphenol, 4,4'-(9-fluorenylidene)diphenol, 4,4'-(1,3-adamantanediyl)diphenol, 4,4'-isopropylidenediphenol, 3,4'-isopropylidenediphenol, 4,4'-(9-fluorenylidene)diphenol, 4,4'-(hexafluoroisopropylidene)diphenol, 4,4'-isopropylidenediphenol, 4,4'-sulfonyldiphenol, 4,4'-thiodiphenol, bisphenol-A, or 4,4'-hexafluoroisopropylidene.

When these compounds are mixed with the polymerizable monomer represented by Formula 4, a desired polysulfone can be obtained.

A method of washing the clay will now be described in detail. In order to remove impurities from the clay, the clay is ball milled with distilled water in a container at 100 rpm for 3 or more days to obtain an aqueous clay dispersion. Then, the clay dispersions are centrifuged, washed with tertiary distilled water, redistributed, centrifuged again, and then washed. Subsequently, the result is again redistributed, centrifuged, and then washed. The resultant washed clay is dried by heating or freeze drying, and then, the dry clay is milled into a powder form.

In order to remove moisture from the unmodified clay, the clay is heated at 100° C. at atmospheric pressure for 5 or more hours, and then heated at 60° C. or higher at reduced pressure for 4 or more hours. The amount of the clay may be in the range of 0.1 to 50 parts by weight based on 100 parts by weight the nanocomposite. When the amount of the clay is less than 0.1 parts by weight, barrier properties of the clay cannot be obtained. On the other hand, when the amount of the clay is more than 50 parts by weight, the clay has high viscosity and is brittle.

In preparing the nanocomposite according to the first method embodiment of the present invention, as illustrated in FIG. 2, moisture is removed from an unmodified clay as described above, and then the moisture-free unmodified clay is dispersed in a dispersing medium to obtain a clay dispersion solution. The resultant is mixed with the first polymerizable monomer, represented by Formula 3, the second polymerizable monomer, represented by Formula 4, the diol compound, represented by Formula 5, a solvent, and a base. As non-limiting examples, the dispersing medium can be N-methylpyrrolidone, dimethylacetamide, dimethylformamide, dimethylsulfoxide, or the like. The amount of the dispersing medium may be in the range of 50 to 1000 parts by weight based on 100 parts by weight of the unmodified clay. Within this range, the clay can be uniformly dispersed.

As non-limiting examples, the solvent can be toluene, benzene, xylene, N-methylpyrrolidone, dimethylacetamide, dimethylformamide, or dimethylsulfoxide. The amount of the solvent may be in the range of 50 to 500 parts by weight based on 100 parts by weight of the total weight of the first polymerizable monomer, the second polymerizable monomer, and the third polymerizable monomer.

As non-limiting examples, the base can be K$_2$CO$_3$ or Na$_2$CO$_3$. The amount of the base may be in the range of 0.5 to 3 mole based on 1 mole of the third polymerizable monomer.

The polymerization temperature can be any temperature at which water generated during a nucleophilic reaction can be removed while being refluxed with toluene. As a non-limiting example, the polymerization can be performed at a temperature of 100 to 180° C., or, for example, 120 to 160° C., and then at a temperature of 140 to 195° C., or, for example, 160 to 180° C. Alternatively, polymerization can be performed by refluxing at 140° C. for 4 hours, then, the reaction mixture can be left to sit at 160° C. for 4 or more hours, and then be left to sit at 180° C. for 4 hours.

During the performing of the polymerization at the first temperature of 100 to 180° C., the generated water is removed and a precursor that is used to form polysulfone is formed. During the performing of the polymerization at the second temperature of 140 to 195° C., polymerization substantially occurs so that the viscosity increases over time.

Subsequently, the resultant is heat treated to complete polymerization. The polymerization product is cooled and then subjected to a work-up process, such as precipitating using ethanol or distilled water. As a result, a nanocomposite can be obtained.

The amount of the second polymerizable monomer may be in the range of 0.1 to 3 moles based on 1 mole of the first polymerizable monomer. When the amount of the second polymerizable monomer is less than 0.1 moles, the ionic conductivity of an electrolyte membrane is low. On the other hand when the amount of the second polymerizable monomer is more than 3 moles, the swelling degree of the polymer due to water is so high that it may be difficult to form an electrolyte membrane.

The amount of the diol compound may be in the range of 0.7 to 1.3 moles based on 1 mole of the first polymerizable monomer and the second polymerizable monomer. When the amount of the diol compound is outside this range, desired reactivity of the polymerization cannot be obtained.

According to the first method embodiment of the present invention, a clay modifier such as a compound that forms a terminal group on the polymer formed by the polymerization described above can be added to the mixture of the first polymerizable monomer, the second polymerizable monomer, and diol compounds.

The amount of the clay modifier may be in the range of 0.001 to 0.5 mole based on 1 mole of the first polymerizable monomer represented by Formula 3, the second polymerizable monomer represented by Formula 4, and the diol compound represented by Formula 5. When the amount of the clay modifier is less than 0.001 mole, the amount of the clay modifier that can contact the clay is small and thus no modifying effects occur. On the other hand, when the amount of the clay modifier is more than 0.5 moles, the molecular weight of the nanocomposite does not increase.

Figure 3:
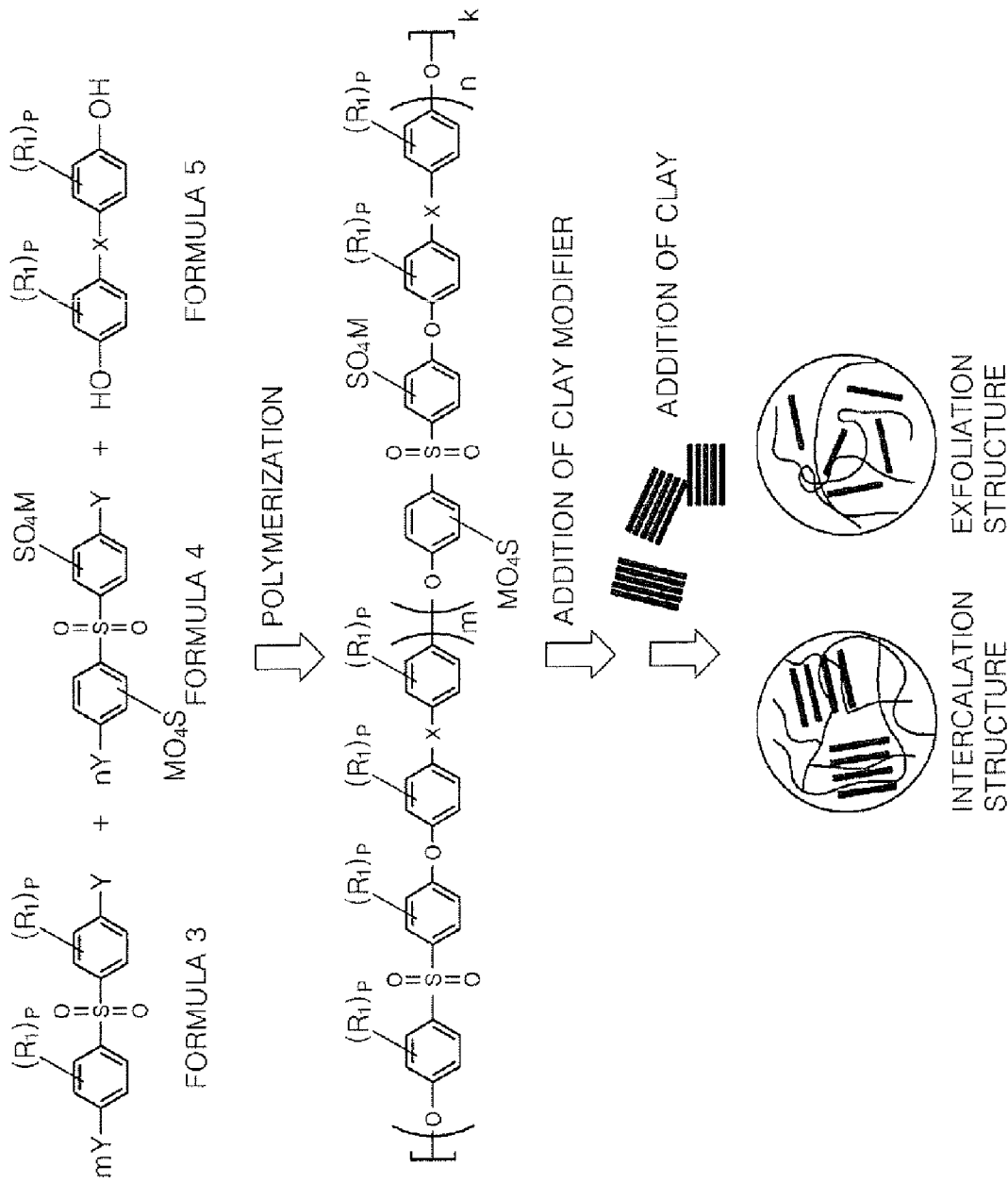
Figure 4:
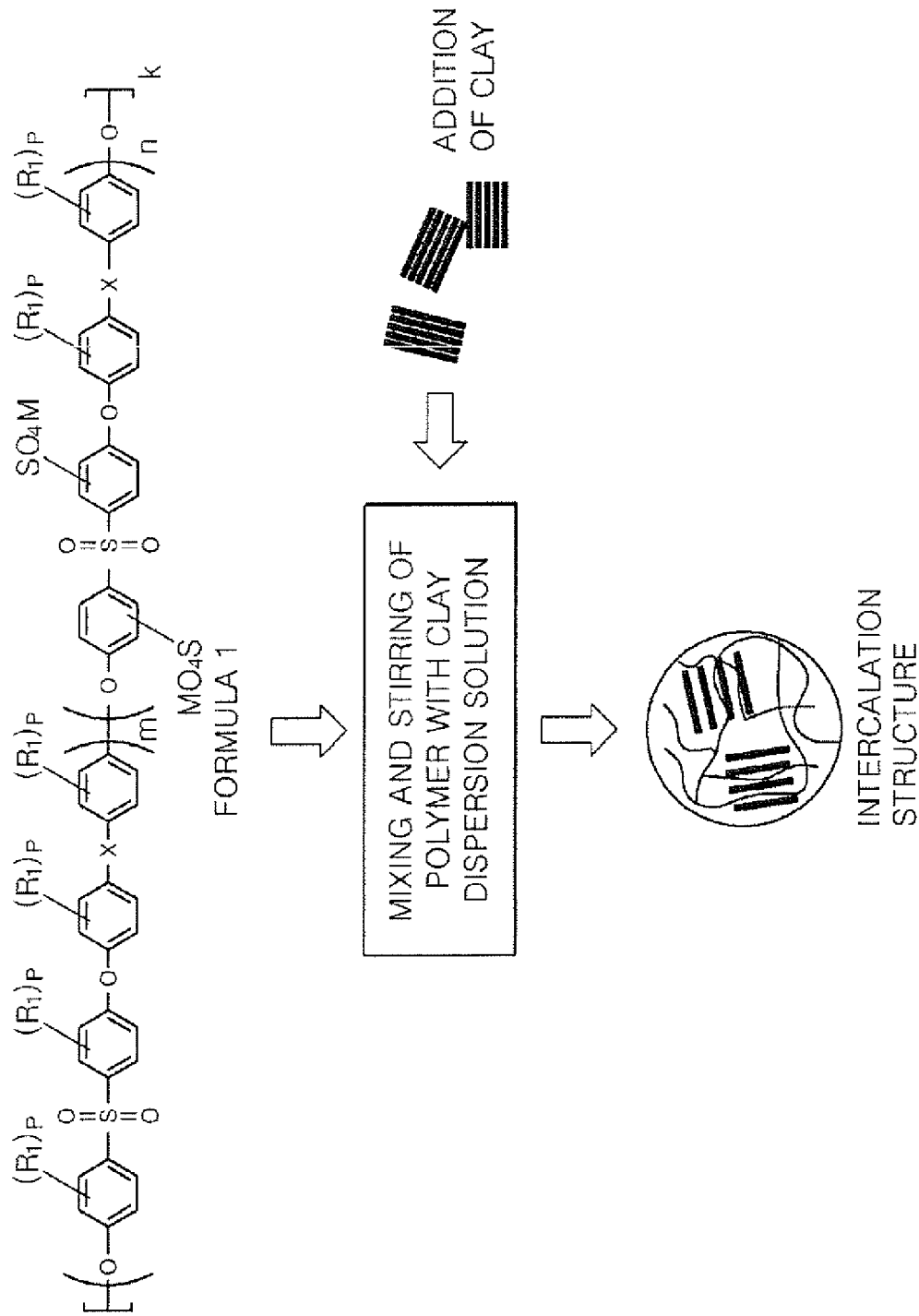

In preparing the nanocomposite according to the second method embodiment of the present invention, as illustrated in FIG. 3, first, a first polymerizable monomer represented by Formula 3, a second polymerizable monomer represented by Formula 4, and a diol compound represented by Formula 5 are mixed with a solvent and heated together to perform polymerization. At this time, heating conditions, and the amount and kind of a solvent, first, second, and third polymerizable monomers and a diol compound are the same as in the first method embodiment of the present invention.

In the latter part of the polymerization, if desired, a clay modifier can be added to the mixture and then polymerization can be allowed to continue at a temperature of 50 to 195° C. When the heat treatment temperature is more than 195° C., depolymerization occurs so that it is difficult to obtain a nanocomposite having a desired molecular weight. On the other hand, when the heat treatment temperature is lower than 50° C., the reactivity of the polymerization reaction decreases.

The polymerization product is cooled to 20 to 150° C. and then a clay dispersion solution prepared by dispersing an unmodified clay into a dispersing medium is added thereto. The polymerization product and the clay dispersion solution are mixed at 70° C. for 6 to 48 hours, or as a more specific non-limiting example, for about 24 hours. The resultant product is then subjected to a work-up process of precipitating with distilled water. As a result, a nanocomposite can be obtained using the second method embodiment of the present invention.

The kind and amount of the clay modifier, the unmodified clay, and the dispersing medium are the same as in the first method embodiment of the present invention.

The method of preparing the nanocomposite according to the third method embodiment of the present invention will now be described in detail with reference to FIG. 4.

First, a first polymerizable monomer represented by Formula 3, a second polymerizable monomer represented by Formula 4, a diol compound represented by Formula 5, and a solvent are mixed and then heat treated to achieve polymerization. As a result, the sulfonated polysulfone represented by Formula 1 is produced. At this time, the polymerization temperature is in the range of room temperature, such as approximately 20° C., to 50° C.

The sulfonated polysulfone represented by Formula 1 is dissolved in a solvent and then a clay dispersion solution prepared by dispersing an unmodified clay in a dispersing medium is added thereto. The mixture of the sulfonated polysulfone and the clay dispersion solution is strongly stirred at room temperature, approximately 20° C., for 6 to 48 hours, or as a more specific, non-limiting example, for about 24 hours. As non-limiting examples, the solvent used can be dimethylacetamide, N-methylpyrrolidone dimethylformamide, dimethylsulfoxide, or the like. The amount of the solvent may be 100 to 600 parts by weight based on 100 parts by weight of sulfonated polysulfone represented by Formula 1.

Subsequently, the reaction product undergoes a work-up process of precipitating with distilled water to obtain a nanocomposite according to the third method embodiment of the present invention.

In the third method embodiment, a clay modifier can be added when polymerization is completed. The kind and amount of the clay modifier are the same as described above.

The sulfonated polysulfone obtained according to the processes described above may have a weight average molecular weight of 20,000 to 500,000, and a number average molecular weight of 10,000 to 300,000. When the weight average molecular weight and the number average molecular weight of the sulfonated polysulfone are less than 20,000 and 10,000, respectively, film formation properties decrease so that it is difficult to obtain an electrolyte membrane. On the other hand, when the weight average molecular weight and the number average molecular weight of the sulfonated polysulfone are more than 500,000 and 300,000, respectively, the processability may deteriorate.

Nanocomposites according to aspects of the present invention can be identified by X-ray diffraction analysis. The $2\theta$ value of the diffraction pattern of dry unmodified clay is 7.8° (when the interlayer distance is 1.14 Å). When the interlayer distance widens, the $2\theta$ value of the X-ray diffraction pattern is 1.2 (mechanical lowest limit) and ultimately, the dry unmodified clay loses the X-ray diffraction pattern, that is, the dry unmodified clay has an exfoliated structure. X-ray diffraction is carried out with a CuK-$\alpha$ X-ray (wavelength 1.541 Å) on samples in powder form or in a thin film state at room temperature (20° C.) in an air atmosphere.

According to X-ray diffraction analysis results, a peak of a 001 surface of clay may disappear (indicating an exfoliated structure) or may be widened (indicating an intercalation structure).

A method of preparing an electrolyte membrane of a fuel cell using a nanocomposite according to the present invention will now be described in detail.

An electrolyte membrane forming composition which is prepared by mixing the a nanocomposite prepared as described above, a basic polymer, and a solvent is cast onto or coated on a support and then dried to form an electrolyte membrane including a nanocomposite ion complex. As non-limiting examples, the solvent can be dimethylacetamide, N,N'-dimethylsulfoxide (DMSO), N-methyl-2-pyrrolidone (NMP), dimethylformamide (DMF), or the like. The amount of the solvent may be in the range of 100 to 600 parts by weight based on 100 parts by weight of the nanocomposite. When the amount of the solvent is outside this range, processability during casting or coating deteriorates, and mechanical properties of the electrolyte membrane decrease.

In some cases, a nanocomposite in which —OH exists at the end of the sulfonated polysulfone and a basic polymer can be dissolved in a solvent, and then, an acryl polyol and a curing agent can be added thereto. The resultant mixture is cast or coated to form an electrolyte membrane. The acryl polyol and the curing agent can be added by being dissolved in a solvent. The solvent that dissolves the acryl polyol and the curing agent can be any solvent that can dissolve acryl polyol. As non-limiting examples, the solvent can be toluene, 2-propanol, or benzene. On the other hand, the solvent that dissolves the sulfonated polysulfone can be N,N'-dimethyl sulfoxide (DMSO), N-methyl-2-pyrrolidone (NMP), dimethylformamide (DMF), or the like.

By including an acryl-based polymer that is formed through a curing reaction of the acryl polyol and the curing agent, the electrolyte membrane has excellent film formation properties and thus is easily produced. In particular, even when the molecular weight of the sulfonated polysulfone is less than 10,000, film formation can be easily achieved and the mechanical properties of the electrolyte membrane are improved.

The amount of the acryl polyol may be in the range of 0.001 to 20 parts by weight based on 100 parts by weight of the polymer having the sulfonic acid group, that is, the sulfonated polysulfone. When the amount of the acryl polyol is less than 0.001 parts by weight, the curing degree is low. On the other hand, when the amount of the acryl polyol is more than 20 parts by weight, the curing degree is so high that conductivity of the electrolyte membrane decreases.

As non-limiting examples, the acryl polyol may include at least one (meth)acrylic acid or alkyl(meth)acrylic acid selected from methyl methacrylate, butyl acrylate, ethyl acrylate, butyl methacrylate, ethyl methacrylate, methacrylic acid, and acrylic acid.

As non-limiting examples, the curing agent can be a compound including isocyanate, such as p-phenylene diisocyanate, 1,6-hexamethylene diisocyanate, toluene diisocyanate, 1,5-naphthalene diisocyanate, isophorone diisocyanate, 4,4'-diphenylmethane diisocyanate, and cyclomethane diisocyanate. The amount of the curing agent may be 0.01 to 20 parts by weight based on 100 parts by weight of the polymer having a sulfonic acid group, that is, sulfonated polysulfone. When the amount of the curing agent is less than 0.01 parts by weight, the degree of crosslinking of the acryl polyol decreases. On the other hand, when the amount of the curing agent is more than 20 parts by weight, excess curing agent that is not involved in a crosslinking reaction remains.

For example, through the curing reaction of acryl polyol and diisocyanate, an acryl-based polymer having a urethane bond can be formed. In particular, if the mole ratio of isocyanate groups to —OH groups is 2, the acryl-based polymer having a urethane bond can be formed using Reaction Scheme 1:

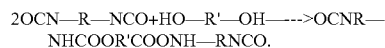

Referring to Reaction Scheme 1, in the curing reaction of acryl polyol with curing agent, the mole ratio of isocyanate group to —OH group can be in the range of 3 to 0.1.

The electrolyte membrane prepared as described above can be subjected to an acid treatment. The electrolyte membrane is immersed in a sulfuric acid aqueous solution, heated at a temperature of 60 to 99° C., washed using deionized water, and then left to sit at room temperature for 24 hours. The resultant product is washed using deionized water. The sulfuric acid aqueous solution may have a concentration of 0.1 to 3 M, or as a particular, non-limiting example, about 0.5-2 M.

The thickness of the electrolyte membrane according to the embodiment of the present invention is not limited. However, when the electrolyte membrane is too thin, the strength of the electrolyte membrane is too low. On the other hand, when the electrolyte membrane is too thick, an internal resistance of a fuel cell can be too high. Accordingly, the electrolyte membrane may have a thickness of about 20 to about 200 μm.

A fuel cell including the electrolyte membrane according to an embodiment of the present invention will now be described in detail.

The electrolyte membrane according to an embodiment of the present invention can be used in any fuel cell that includes an electrolyte membrane containing a polymer electrolyte, such as a polymer electrolyte membrane fuel cell (PEMFC) using hydrogen as a fuel. A specific example of a PEMFC is a direct methanol fuel cell, which uses a mixture vapor of methanol and water or a methanol aqueous solution as a fuel. In particular, the electrolyte membrane according to an embodiment of the present invention can be more usefully used in a direct methanol fuel cell using methanol aqueous solution as a fuel.

In a fuel cell that includes a cathode in which oxygen is reduced, an anode in which a fuel is oxidized, and an electrolyte membrane interposed between the cathode and the anode, the electrolyte membrane used is the electrolyte membrane described above according to an aspect of the present invention.

The cathode includes a catalyst layer that promotes the reduction of oxygen. The catalyst layer includes a catalyst particle and a polymer having a cation exchanger. The catalyst can be, for example, a carbon supported Pt catalyst (Pt/C catalyst).

The anode includes a catalyst layer that promotes the oxidation of a fuel such as hydrogen, natural gas, methanol, or ethanol. The catalyst layer includes a catalyst particle and a polymer having a cation exchanger. The catalyst can be, for example, a Pt supporting carbon catalyst or a Pt—Ru supporting carbon catalyst. The Pt—Ru supporting carbon catalyst is useful when an organic fuel, excluding hydrogen, is directly provided to the anode.

The catalyst used in the cathode and the anode includes catalyst metal particles and a catalyst support. The catalyst support can be a solid particle that has conductivity and micropores that enable the catalyst support to support catalyst metal particles. Such a solid particle can be, for example, carbon powder, such as carbon black, ketchen black, acetylene black, active carbon powder, carbon fiber powder, or a mixture of these. The polymer having a cation exchanger can be the polymer described above.

The catalyst layers of the cathode and the anode contact the electrolyte membrane.

Each of the cathode and the anode may further include, in addition to the catalyst layer, a gas diffusion layer. The gas diffusion layer includes a porous material having electrical conductivity. The gas diffusion layer acts as a current collector and a passage through which reactants and generated reaction products move. As non-limiting examples, the gas diffusion layer can be formed of carbon paper, preferably water-repellent carbon paper, and more preferably water-repellent carbon paper that is coated with a water-repellent carbon black layer. The water-repellent carbon paper includes a hydrophobic polymer, such as polytetrafluoroethylene (PTFE). The hydrophobic polymer is sintered. The use of a water-repellent material in the gas diffusion layer allows polar liquid reactants and gas reactants to move therethrough. In the water-repellent carbon paper having a water-repellent carbon black layer, the water-repellent carbon black layer includes carbon black and a hydrophilic polymer, such as PTFE, as a hydrophobic binder, and is attached to one surface of the water-repellent carbon paper. The hydrophobic polymer of the water-repellent carbon black layer is sintered.

The cathode and the anode can be manufactured using various methods disclosed in many references, and thus will not be described in detail.

The fuel that is provided to the anode of the fuel cell according to an embodiment of the present invention can be hydrogen, natural gas, methanol, or ethanol.

As a non-limiting example, a liquid fuel that includes a polar organic fuel and water can be supplied to the anode. As a specific, non-limiting example, the polar organic fuel can be methanol or ethanol.

The liquid fuel can be a methanol aqueous solution. In the fuel cell according to an embodiment of the present invention, the crossover of a polar organic fuel is impeded by the electrolyte membrane, which enables the use of a high-concentration methanol aqueous solution. In a conventional direct methanol fuel cell, it is common that a 6-16 wt % low-concentration methanol aqueous solution is used due to the crossover of methanol. On the other hand, even when the fuel cell according to an embodiment of the present invention uses such a low-concentration methanol aqueous solution, the crossover of a polar organic fuel can be more prevented by the electrolyte membrane, and thus, the fuel cell has long lifetime and high efficiency Aspects of the present invention will be described in further detail with reference to the following examples. These examples are for illustrative purposes only and are not intended to limit the scope of the present invention.

Example 1

Manufacturing of Electrolyte Membrane 0.1 mole of sulfated-4,4' dichlorodiphenyl sulfone (S-DCDPS), 0.35 mole of 4,4' dichlorodiphenyl sulfone (DCDPS), 0.459 mole of 4,4'-(hexafluoroisopropylidene) diphenol (HFIPDP), and 0.55 mole of $K_2CO_3$ were refluxed using 120 mL of N-methyl-2-pyrrolidone (NMP) and 100 mL of toluene as a solvent at 150° C. for 12 hours in a reaction vessel including a dean stock apparatus, and the generated water was removed. After confirming that water no longer flowed out through the dean stock apparatus, toluene was removed using a valve of the dean stock apparatus. The temperature of the reaction mixture was increased to 180° C. for 2 hours, and then at the same temperature, condensation polymerization was performed for 4 hours.

The viscosity of the solution during the polymerization increased over time. When the polymerization was completed, the polymerization product was cooled to 70° C. 2.0 g of montmorillonite (MMT) (3 wt % based on the total weight of S-DCDPS, DCDPS, and HFIPDP), acting as an unmodified clay, dispersed in 20 g of NMP, was added to the cooled polymerization product, and mixed together for 24 hours. The resultant mixture was cooled to room temperature, and then was precipitated using distilled water. As a result, a sulfonated polysulfone nanocomposite (degree of sulfonation: approximately 60%, number average molecular weight: approximately 60,000) was obtained.

100 parts by weight of the sulfonated polysulfone nanocomposite obtained as described above was dissolved in 200 parts by weight of dimethylacetamide, and then 5 parts by weight of polybenzimidazole was added thereto and mixed. The resultant mixture was coated onto a glass substrate using a doctor blade, dried at 90° C. for 30 minutes, and then dried at 100° C. for 10 minutes, thereby obtaining an electrolyte membrane having a thickness of about 50 μm.

The electrolyte membrane was treated using an aqueous solution of sulfuric acid so that the electrolyte membrane was changed into an acid form.

The electrolyte membrane, an anode having a Pt—Ru black catalyst, and a cathode having a Pt black catalyst were assembled to form a fuel cell.

A change in cell voltage with respect to current density of the fuel cell was measured. At this time, the operation temperature was about 50° C., the fuel was a 2M methanol aqueous solution, and the oxidant was air.

Example 2

An electrolyte membrane and a fuel cell were manufactured in the same manner as in Example 1, except that bisphenol A was used instead of HFIPDP.

Example 3

A sulfonated polysulfone nanocomposite was synthesized in the same manner as in Example 1, except that two kinds of diols, specifically, 30 wt % of HFIPDP and 70 wt % of bisphenol A, were used. An electrolyte membrane and a fuel cell were produced in the same manner as in Example 1, except that, laponite was used as the clay, and in order to form the electrolyte membrane, a mixture to which 5 parts by weight of polybenzimidazole was added was mixed with poly(methyl methacrylate-co-butylacrylate-co-hydroxyethyl methacrylate) as acryl polyol, 1-propanol as a solvent, and 1,6-hexamethylene diisocynate as a curing agent in a mixed weight ratio of 8:400:0.8, respectively.

Example 4

An electrolyte membrane and a fuel cell were manufactured in the same manner as in Example 1, except that laponite was used instead of MMT.

Example 5

An electrolyte membrane and a fuel cell were manufactured in the same manner as in Example 2, except that laponite was used instead of MMT.

Comparative Example 1

An electrolyte membrane and a fuel cell were manufactured in the same manner as in Example 1, except that the unmodified clay was not used.

Comparative Example 2

A fuel cell was manufactured in the same manner as in Example 1, except that NAFION 112 (DuPont) was used as an electrolyte membrane.

Comparative Example 3

A fuel cell was manufactured in the same manner as in Example 1, except that NAFION 115 (DuPont) was used as an electrolyte membrane.

Comparative Example 4

An electrolyte membrane and a fuel cell were manufactured in the same manner as in Example 1, except that the amount of polybenzimidazole was 10 parts by weight and MMT acting as the unmodified clay was not used.

The electrolyte membrane prepared according to Example 1 was measured using an optical microscope. The results are shown in FIG. 5.

Figure 5:
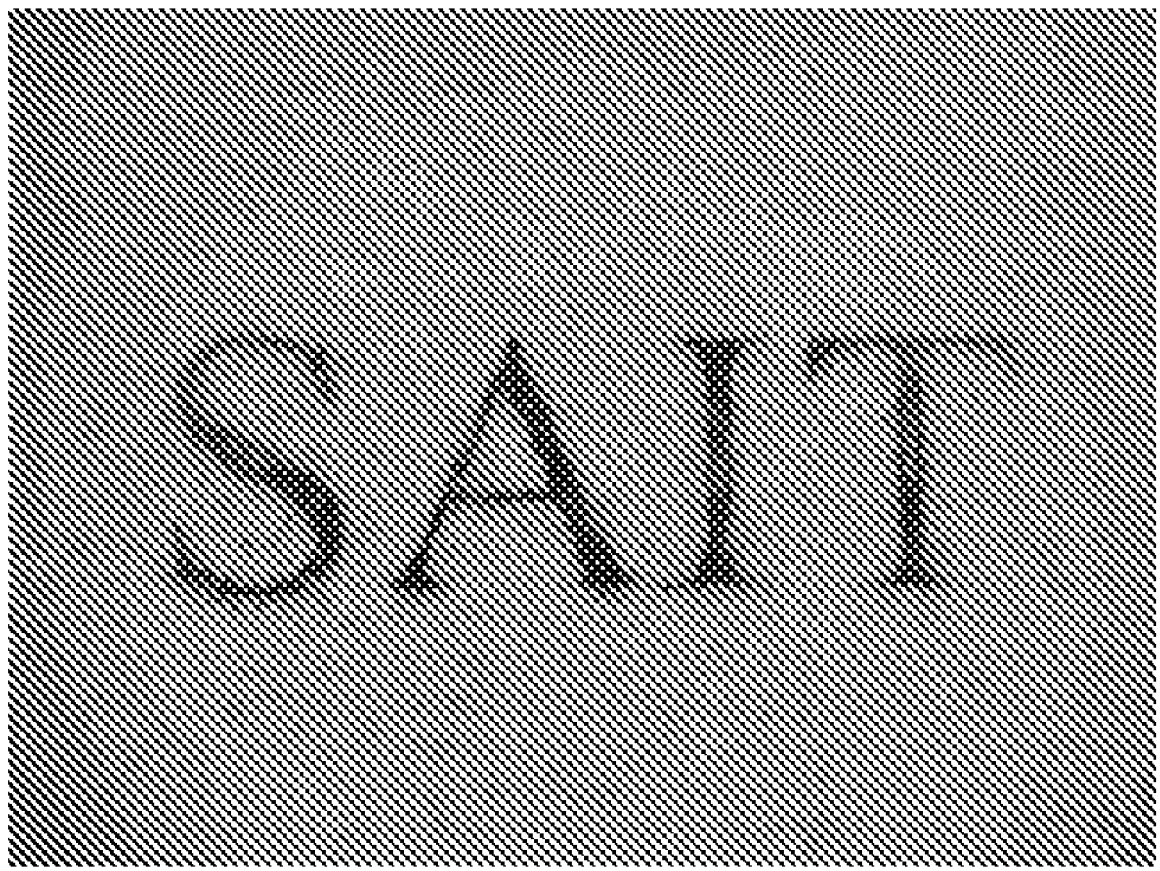
FIG. 5 is an optical microscope image of an electrolyte membrane prepared according to Example 1.

Referring to FIG. 5, it was found that no phase separation occurred in the electrolyte membrane prepared according to Example 1.

Figure 6A:
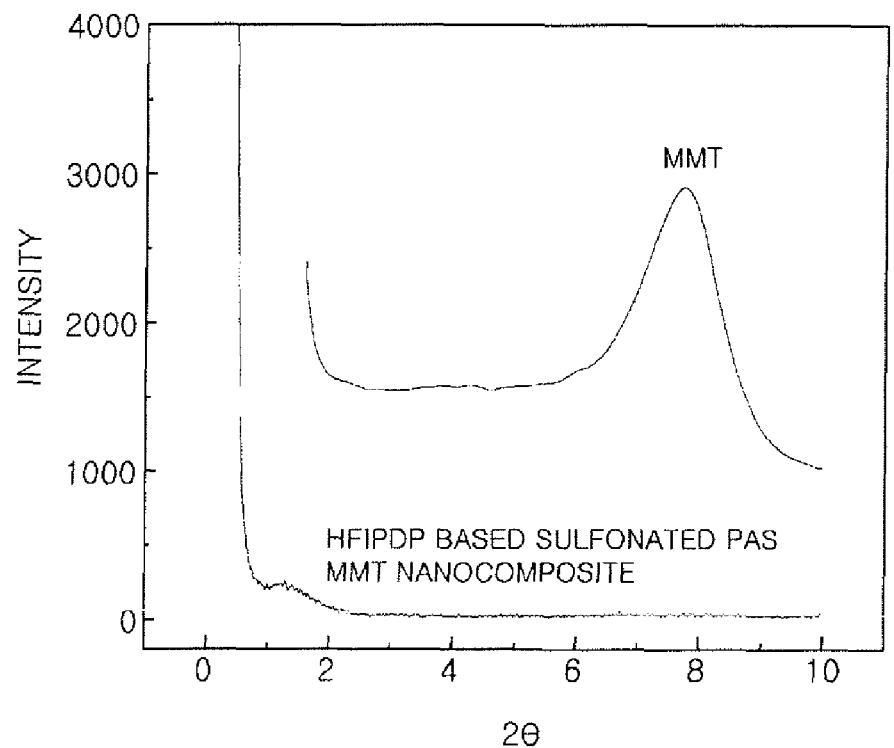
FIG. 6A is a graph illustrating results of X-ray diffraction analysis of an electrolyte membrane formed of a nanocomposite ion complex prepared according to Example 1.

X-ray diffraction analysis was performed on the electrolyte membrane formed from the nanocomposite ion complex prepared according to Example 1. The results are shown in FIG. 6A. In FIG. 6A, the plot of MMT itself is used as a reference.

Figure 6B:
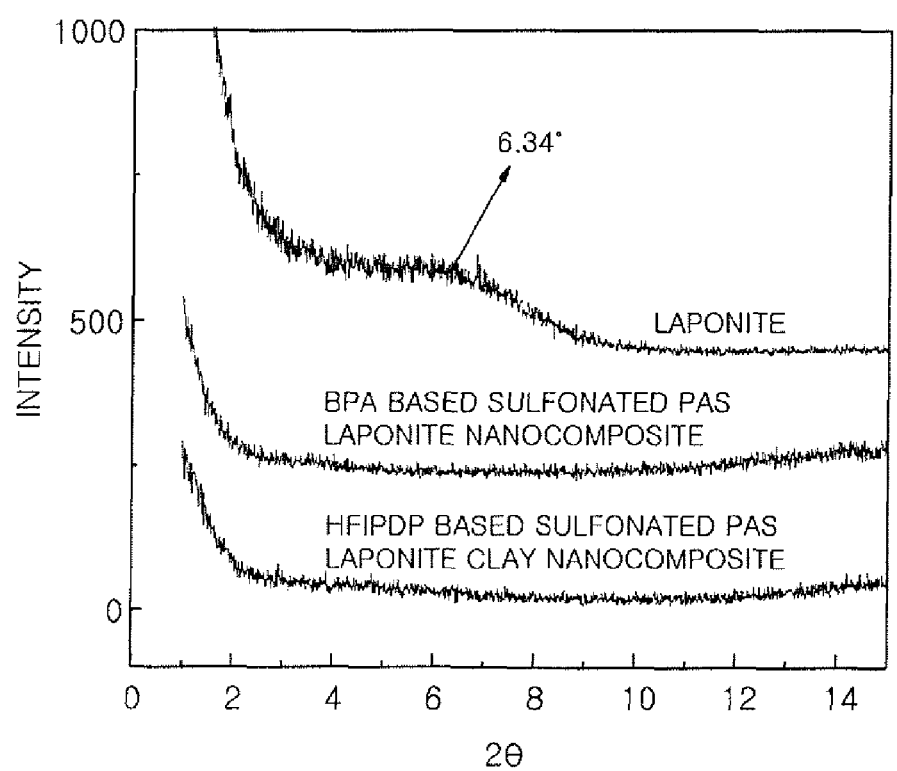
FIG. 6B is a graph illustrating results of X-ray diffraction analysis of electrolyte membranes formed of nanocomposite ion complexes prepared according to Examples 4 and 5.

X-ray diffraction analysis was performed on the electrolyte membranes formed of the nanocomposite ion complexes prepared according to Example 4 and 5. The results are shown in FIG. 6B. In FIG. 6B, the plot of laponite itself is used as a reference.

The electrolyte membrane prepared according to Example 3 was measured using a transmission electronic microscope (TEM). The results are shown in FIGS. 7A to 7C. FIGS. 7B and 7C are gradually enlarged images of FIG. 7A.

Referring to FIGS. 7 A, B and C, it was found that clay lost its regularity and was dispersed in the sulfonated polysulfone matrix. That is, in the composite prepared using laponite according to Example 3, the clay lost its interlayer regularity and had an exfoliation structure. In order to obtain the transmission electronic microscope (TEM) images, a sample in a powder state was pressed and formed into pellets, and these pellets underwent epoxy molding and cutting. The relatively brighter part in FIG. 7A is epoxy.

The tensile strength and toughness of the electrolyte membranes formed of the nanocomposite ion complexes prepared according to Example 1 and Comparative Example 1 were measured. The results are shown in Table 1. In Table 1, N115 denotes NAFION 115 produced by DuPont.

TABLE 1

| | Tensile Strength (N/mm$^2$) | Toughness (J/mm$^3$) |
|---|---|---|
| N115 | 24.1 | $5.4 \times 10^7$ |
| Example 1 | 48.6 | $5.2 \times 10^6$ |
| Comparative Example 1 | unmeasurable | unmeasurable |

Referring to Table 1, it was found that the strength of an electrolyte membrane containing polysulfone having a high degree of sulfonation (60%) increased significantly. Ionic conductivity of the electrolyte membranes prepared according to Example 1 and Comparative Examples 1 and 4 was measured. The results are shown in Table 2. The ionic conductivity was measured using a 4-point probe method. A membrane connected to the 4-point cell was placed in deionized water and an alternating current of 20 Mv and 500000 Hz-0.1 Hz was applied thereto at temperatures of 20° C., 40° C., 50° C., and 60° C. to obtain Nyquist plots.

TABLE 2

| | Ionic Conductivity (S/cm) | | | |
|---|---|---|---|---|
| | 20° C. | 40° C. | 50° C. | 60° C. |
| Example 1 | 0.090 | 0.124 | 0.137 | 0.149 |
| Comparative Example 1 | N.A. | N.A. | N.A. | N.A. |
| Comparative Example 4 | 0.02 | — | — | — |
| NAFION 112 | 0.089 | 0.121 | 0.133 | 0.146 |

Referring to Table 2, it was found that the electrolyte membrane prepared according to Example 1 showed excellent conductivity even when a basic polymer was used. (In general, use of the basic polymer typically results in low conductivity.)

Figure 8:
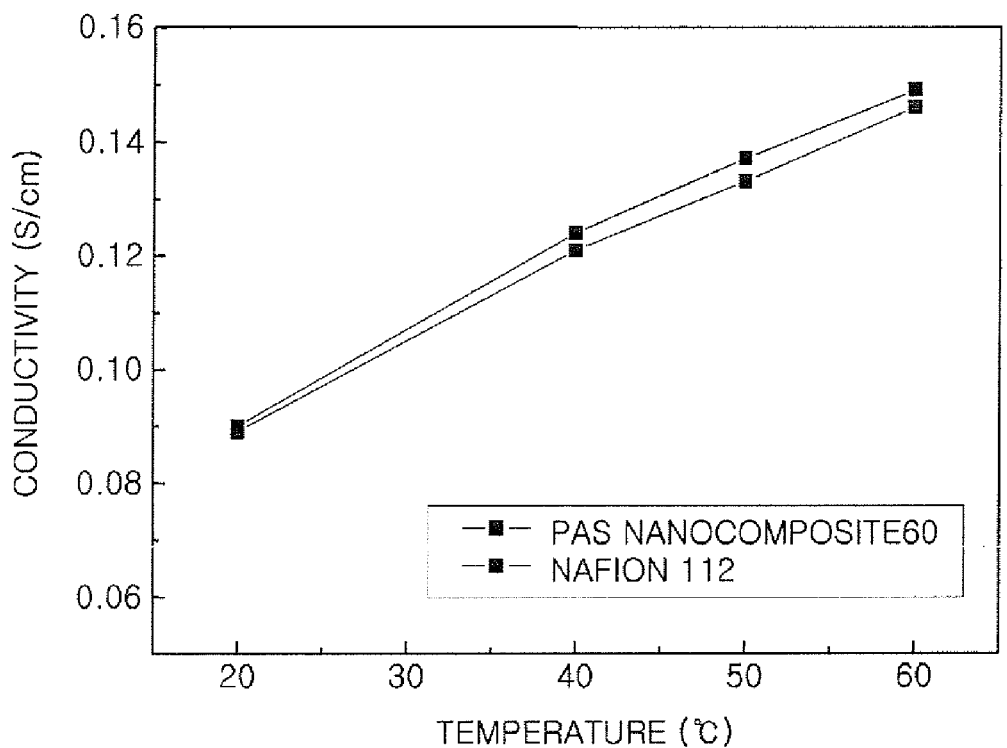
FIG. 8 is a graph of conductivity with respect to temperature of fuel cells prepared according to Example 1 and Comparative Example 2.

A change in conductivity with respect to temperature of the fuel cells manufactured according to Example 1 and Comparative Example 2 was measured. The results are shown in FIG. 8.

Active cell performance was assessed by measuring a change in current density with respect to operating time of the fuel cells manufactured according to Example 1 and Comparative Example 3. The results are shown in FIG. 9.

Figure 9:
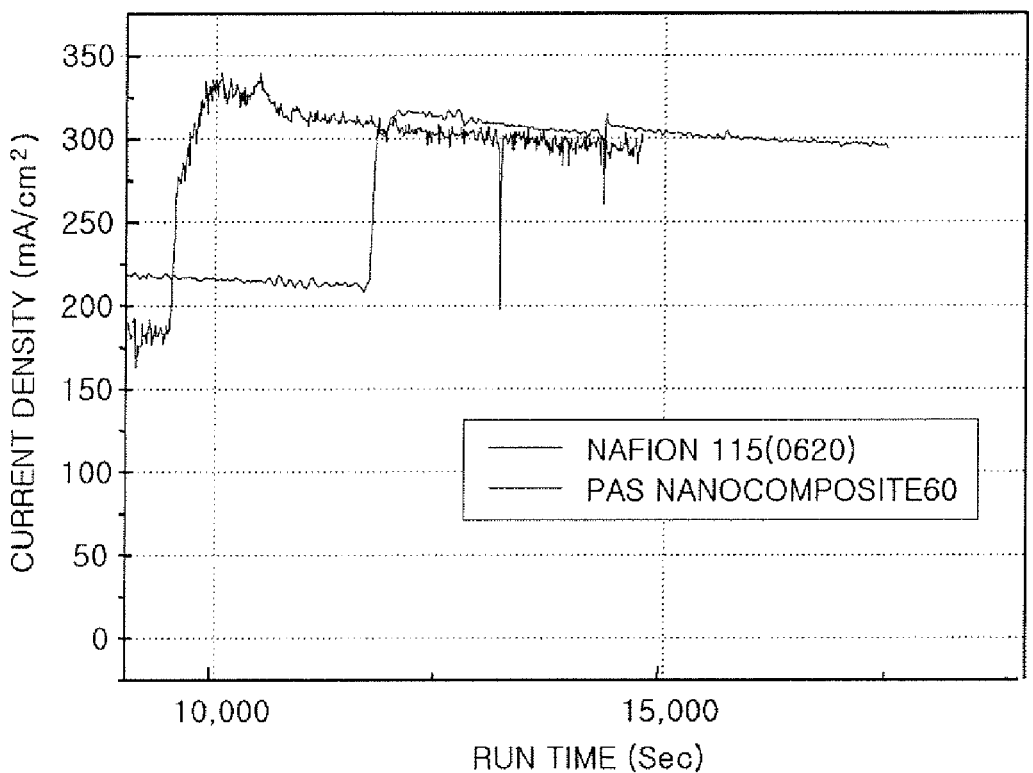
FIG. 9 is a graph of current density with respect to operating time of fuel cells prepared according to Example 1 and Comparative Example 3, illustrating assessment results of active cell performance.

Referring to FIG. 9, the fuel cell prepared according to Example 1 showed better performance than the fuel cell using NAFION.

An electrolyte membrane according to aspects of the present invention includes a nanocomposite ion complex that is formed through an acid-base reaction of a basic polymer with a nanocomposite in which an unmodified clay having a layered structure is dispersed in a sulfonic acid group-containing polymer having excellent ionic conductivity, such as sulfonated polysulfone, on a nanoscale basis. The electrolyte membrane shows high mechanical strength, excellent ionic conductivity, and excellent methanol crossover impeding properties, even when a degree of sulfonation of the sulfonated polysulfone is high.

When the electrolyte membrane is used in a fuel cell that uses methanol as a fuel, the crossover of methanol is more impeded, and thus the fuel cell has high operation efficiency and a long lifetime.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte membrane, comprising:
a nanocomposite ion complex that is a reaction product of a nanocomposite and a basic polymer, the nanocomposite comprising a polymer having a sulfonic acid group and an unmodified clay dispersed in the polymer having the sulfonic acid group, wherein either the unmodified clay has a layered structure and the polymer having the sulfonic acid group is intercalated between layers of the clay or the unmodified clay has an exfoliated structure and exfoliated layers of the unmodified clay are dispersed in the polymer having the sulfonic acid group, and wherein the polymer having the sulfonic acid group is represented by Formula 2:

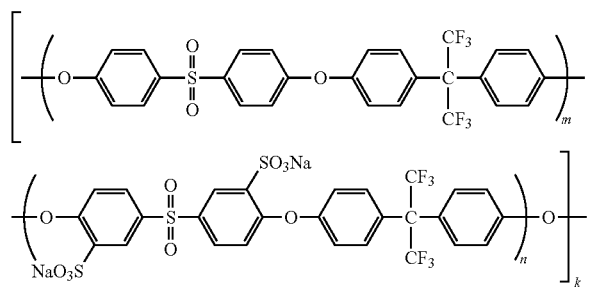

(2)

where m is a real number from 0.1 to 4, n is a real number from 0.1 to 4, k is a real number from 5 to 500, and the polymer having the sulfonic acid group has a degree of sulfonation of about 40 to about 80%.

2. The electrolyte membrane of claim 1, wherein the polymer having a sulfonic acid group is a sulfonated polysulfone represented by Formula 1:

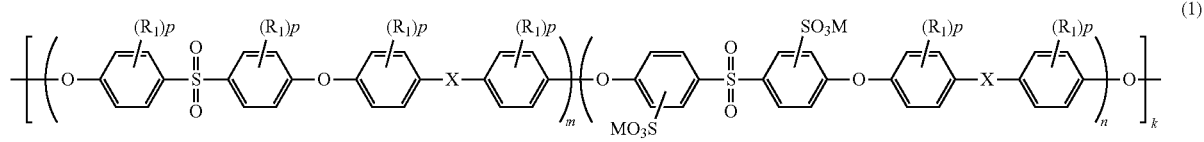

(1)

where each $R_1$ is independently selected from the group consisting of a C1-C10 alkyl group, a C2-C10 alkenyl group, a phenyl group, and a nitro group;
p is an integer from 0 to 4;
X is —C(CF$_3$)$_2$—, —C(CH$_3$)$_2$—, or —PY'(=O)— where Y' is H or C$_6$H$_6$;
M is Na, K, or H;
m is a real number from 0.1 to 10;
n is a real number from 0.1 to 10; and
k is a real number of 5 to 500.

3. The electrolyte membrane of claim 1, wherein the basic polymer comprises at least one compound selected from the group consisting of polybenzimidazole, poly(4-vinylpyridine), polyethylene imine, poly(acrylamide-co-diallyldimethylammonium chloride), poly(diallyldimethylammonium chloride), polyacrylamides, polyurethanes, polyamides, polyamines, polyureas, polybenzoxazoles, polybenzimidazoles, and polypyrrolidones.

4. The electrolyte membrane of claim 1, wherein the amount of the basic polymer is in the range of 0.1 to 40 parts by weight based on 100 parts by weight of the polymer having the sulfonic acid group.

5. The electrolyte membrane of claim 1, further comprising an acryl-based polymer that is a curing reaction product of an acrylpolyol with a curing agent.

6. The electrolyte membrane of claim 1, wherein the unmodified clay is a smectite-based clay.

7. The electrolyte membrane of claim 6, where the smectite-based clay comprises at least one clay selected from the group consisting of montmorillonite, bentonite, saponite, beidellite, nontronite, hectorite, laponite and stevensite.

8. The electrolyte membrane of claim 1, wherein the polymer having the sulfonic acid group has a number average molecular weight of 10,000 to 300,000, and a weight average molecular weight of 20,000 to 500,000.

9. A fuel cell comprising:
a cathode;
an anode; and
the electrolyte membrane of claim 1.

10. A fuel cell comprising:
a cathode;
an anode; and
the electrolyte membrane of claim 2.

11. A fuel cell comprising:
a cathode;
an anode; and
the electrolyte membrane of claim 5.

12. The fuel cell of claim 9, further comprising a polar organic fuel, wherein crossover of the polar organic fuel is suppressed by the electrolyte membrane.

* * * * *